US011359595B2

(12) United States Patent
Coulson et al.

(10) Patent No.: US 11,359,595 B2
(45) Date of Patent: Jun. 14, 2022

(54) RUNNER FOR A HYDRAULIC TURBINE OR PUMP AND METHOD OF MANUFACTURING

(71) Applicant: VOITH PATENT GMBH, Heidenheim (DE)

(72) Inventors: Stuart Coulson, Seven Valleys, PA (US); Jason Foust, Jacobus, PA (US); Jesse Zoll, Mountville, PA (US); Steven McHale, Harrisburg, PA (US); Jianbo Jiang, York, PA (US); Brandon Harmer, York, PA (US)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 17/040,296

(22) PCT Filed: Feb. 28, 2019

(86) PCT No.: PCT/EP2019/054937
§ 371 (c)(1),
(2) Date: Sep. 22, 2020

(87) PCT Pub. No.: WO2019/179742
PCT Pub. Date: Sep. 26, 2019

(65) Prior Publication Data
US 2021/0017948 A1 Jan. 21, 2021

Related U.S. Application Data

(60) Provisional application No. 62/697,736, filed on Jul. 13, 2018, provisional application No. 62/646,589, filed on Mar. 22, 2018.

(51) Int. Cl.
*F03B 3/12* (2006.01)
*F03B 3/18* (2006.01)
*F03B 11/00* (2006.01)

(52) U.S. Cl.
CPC .............. *F03B 3/121* (2013.01); *F03B 3/183* (2013.01); *F03B 11/002* (2013.01);
(Continued)

(58) Field of Classification Search
CPC .. F03B 3/12; F03B 3/121; F03B 3/125; F03B 3/126; F03B 3/128; F03B 11/00;
(Continued)

(56) References Cited

U.S. PATENT DOCUMENTS 1,955,929 A * 4/1934 Mueller .................... F01D 5/20
415/221
5,823,740 A 10/1998 Cybularz et al.
(Continued)

FOREIGN PATENT DOCUMENTS

| CN | 106471245 A | 3/2017 |
| JP | 2011137407 A | 7/2011 |
| WO | 2017108120 A1 | 6/2017 |

*Primary Examiner* — Woody A Lee, Jr.
*Assistant Examiner* — Elton K Wong
(74) *Attorney, Agent, or Firm* — Laurence A. Greenberg; Werner H. Stemer; Ralph E. Locher

(57) ABSTRACT

A runner for a hydraulic turbine or pump includes a plurality of blades, each blade being defined by a pressure surface, an oppositely facing suction surface, a leading edge and a spaced apart trailing edge. At least one blade has a device for supplying a flow of oxygen containing gas to the trailing edge of at least one of the blades. The profile of the suction side surface of the blade along a cross section through a point P1 and a point P2 is concave. The point P1 is located on the suction side surface of the trailing edge where an opening is located, the point P2 is spaced apart from the point P1 by less than 3% of the runner outlet diameter D and the point P2 is located upstream of the point P1 on a line perpendicular to the trailing edge starting at the point P1.

8 Claims, 9 Drawing Sheets

(52) U.S. Cl.
CPC ...... *F05B 2260/96* (2013.01); *F05D 2240/24* (2013.01); *F05D 2240/30* (2013.01)

(58) Field of Classification Search
CPC ...... F03B 11/002; F04D 29/18; F04D 29/181; F04D 29/183; F05B 2230/60; F05B 2230/80; F05B 2220/64; F05D 2240/24; F05D 2240/30
See application file for complete search history.

(56) References Cited

U.S. PATENT DOCUMENTS

| | | | |
|---|---|---|---|
| 5,879,130 A | | 3/1999 | Beyer et al. |
| 5,924,842 A | | 7/1999 | Beyer et al. |
| 6,155,783 A | * | 12/2000 | Beyer ................. F03B 3/02 416/90 R |
| 6,524,063 B1 | * | 2/2003 | Beyer ................. F03B 3/125 415/115 |
| 10,781,788 B2 | | 9/2020 | Arce |
| 2005/0008475 A1 | | 1/2005 | Desy |
| 2015/0030460 A1 | * | 1/2015 | Kottilingam ............ F01D 5/005 416/97 R |

* cited by examiner

RUNNER FOR A HYDRAULIC TURBINE OR PUMP AND METHOD OF MANUFACTURING

BACKGROUND OF THE INVENTION

Field of the Invention

The present invention relates generally to hydroelectric turbine or pump installations. More particularly, this invention pertains to hydroelectric installations with means for enhancing the level of dissolved gas in water passing through the turbine or pump.

A significant environmental problem for many hydroelectric facilities is the water quality of discharges. Various attempts have been made to enhance the level of dissolved oxygen in discharged water of hydroelectric installations. For example, U.S. Pat. No. 5,924,842 to Beyer, James R. discloses a runner for a Francis turbine comprising a crown; a band substantially concentric with the crown; and a plurality of blades extending between crown and the band at spaced intervals along the crown, each blade fixedly secured to the crown at an inner edge and to the band at a distal outer edge, each blade having a water directing surface defined by a pressure side, an opposite facing suction side, a leading edge and a spaced apart trailing edge, at least one of the blades including: a leading edge blade portion having a rear edge in which a first slot is machined along at least a portion of the rear edge; a trailing portion having a front edge in which a second slot is machined along at least a portion of the front edge; wherein the trailing portion is fixedly secured to the leading blade portion along the front edge and the rear edge, respectively, so that the first and second channels cooperate to form an integral passage in the at least one of the blades; and means for discharging an oxygen containing gas from the integral passage to a location adjacent the trailing edge.

The objective of the mentioned state of the art is to increase the level of dissolved oxygen downstream of the turbine or pump by introducing an oxygen containing gas into the water passing through the unit. The amount of gas introduced into the water passing through the unit depends on the pressure conditions on the low-pressure side of the runner. For example when the tailwater level rises and therefore the backpressure is increased, the aeration capability of the prior art designs may become ineffective. It is common at hydropower plants that the downstream level (often referred to as tail water level) rises as more flow is passed through the turbine(s) of the hydro plant or if flow is released over an adjacent spillway. The resulting higher tail water level increases the pressure at the outlet of the turbine. In aerating turbines, the source of the oxygen containing gas is often atmospheric air in the hydro plant. As the pressure downstream of the turbine runner increases, the flow of atmospheric air is reduced or even stopped due to insufficient pressure differential.

SUMMARY OF THE INVENTION

The objective of the present invention is to increase the level of dissolved oxygen downstream of the turbine or pump over the level of dissolved oxygen achieved by state of the art when backpressure increases.

The present invention provides a runner of a hydraulic turbine or pump which is capable of maintaining high levels of dissolved oxygen when backpressure increases.

The problem is solved by a runner for a hydraulic turbine or pump, comprising a plurality of blades, each blade being defined by a pressure surface, an oppositely facing suction surface, a leading edge and a spaced apart trailing edge, at least one of the blades having a device for supplying a flow of oxygen containing gas to the trailing edge of the same blade, the device includes a gas inlet aperture, a gas passage and one or more openings in the trailing edge surface to admit gas out of the gas passage to the passing fluid during operation of the runner, the profile of the suctions side surface of the blade along a cross section through a point P1 and a point P2 is concave, the point P1 is located on the suction side surface of the trailing edge where an opening is located and point the P2 is spaced apart from the point P1 by less than 3% of the runner outlet diameter D and the point P2 is located upstream of the point P1 on a line perpendicular to the trailing edge starting at the point P1. Other favorable implementations of the invention are disclosed in the depended claims. A method for manufacturing a runner according the present invention is disclosed in the independent method claim. Other favorable implementations of the method for manufacturing are disclosed in the depended claims thereof.

The inventors have recognized that the problem can be solved by altering the geometry near the trailing edge of the runner to create a local drop in pressure on the trailing edge surface. The present invention also increases the size of the wake downstream of the trailing edge to provide a path for the airflow through the wake into the main flow. This results in significantly higher mass flow of air into the main flow at higher tail water levels where the prior art became less effective or ineffective. Combining this higher mass flow of air with the main flow results in higher dissolved oxygen levels.

The invention will hereinafter be described in conjunction with the appended drawings.

DETAILED DESCRIPTION OF THE INVENTION

Figure 1:
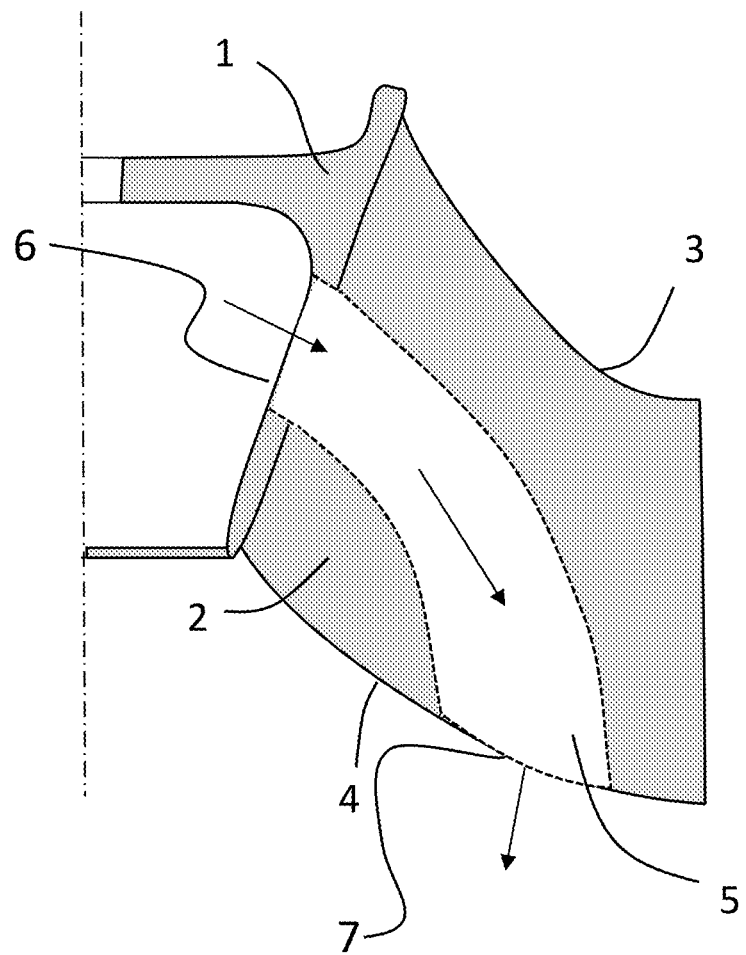
FIG. 1 is a cross-sectional view of an axial type runner according to an embodiment of a runner of the present invention.

FIG. 1 displays schematically a cross-sectional view of an axial type runner. The runner hub is designated as 1 (only the right side is shown completely). A runner blade designated as 2 extends from the hub 1. The blade 2 has a leading edge 3 and a trailing edge 4 meaning that the fluid entering the runner flows from the leading edge 3 towards the trailing edge 4. The fluid flow is divided by the blade 2 whereas one side of the blade 2 forms the pressure surface and the other side the suction surface. At least one blade 2 contains a gas passage, which is designated as 5. The gas passage 5 comprises a gas inlet aperture designated as 6. At the trailing edge 4 the gas passage 5 forms an opening designated as 7. The gas inlet aperture 6 is located in the runner hub 1. The arrows are indicating the gas flow.

Figure 2:
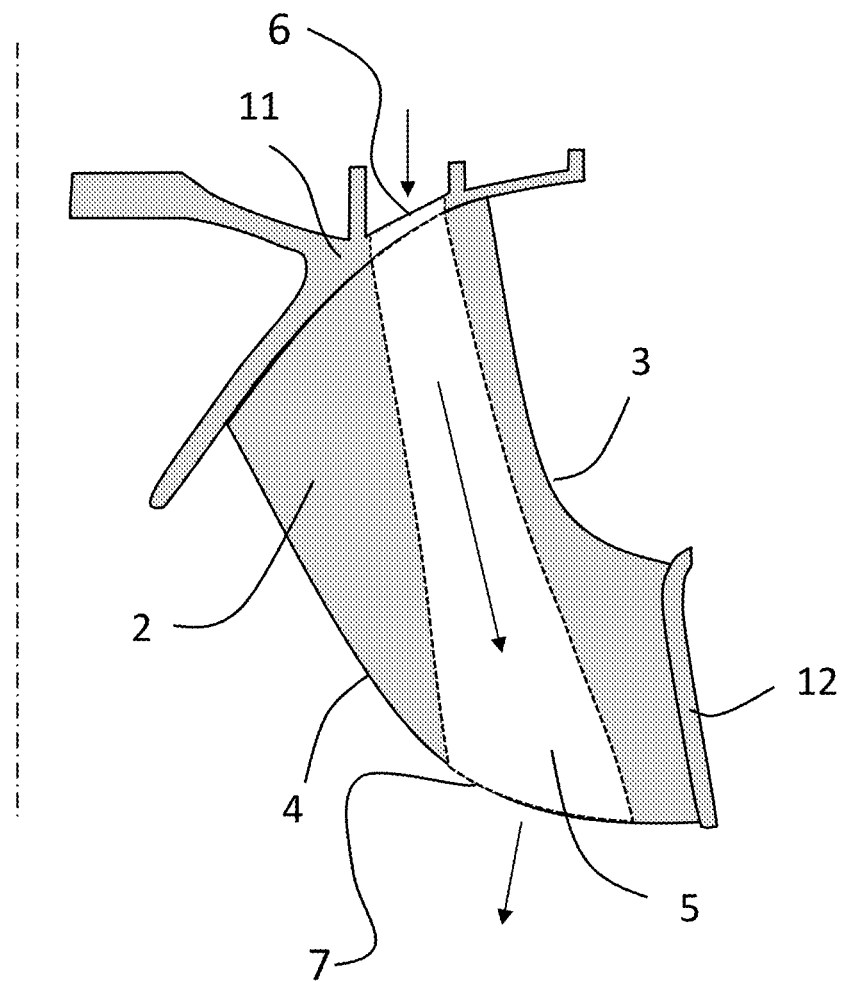
FIG. 2 is a cross-sectional view of a Francis type runner according to an embodiment of a runner of the present invention.

FIG. 2 displays schematically a cross-sectional view of a Francis type runner. The runner crown is designated as 11 (only the right side is shown completely). A runner blade designated as 2 extends between the crown 11 and the band designated as 12. The blade 2 has a leading edge 3 and a trailing edge 4 meaning that the fluid entering the runner flows from the leading edge 3 towards the trailing edge 4. The water flow is divided by the blade 2 whereas one side of the blade 2 forms the pressure surface and the other side the suction surface. At least one blade 2 contains a gas passage, which is designated as 5. The gas passage 5 comprises a gas inlet aperture designated as 6. At the trailing edge 4 the gas passage 5 forms an opening designated as 7. The gas inlet aperture 6 is located in the runner crown 11. The arrows are indicating the gas flow.

Figure 3:
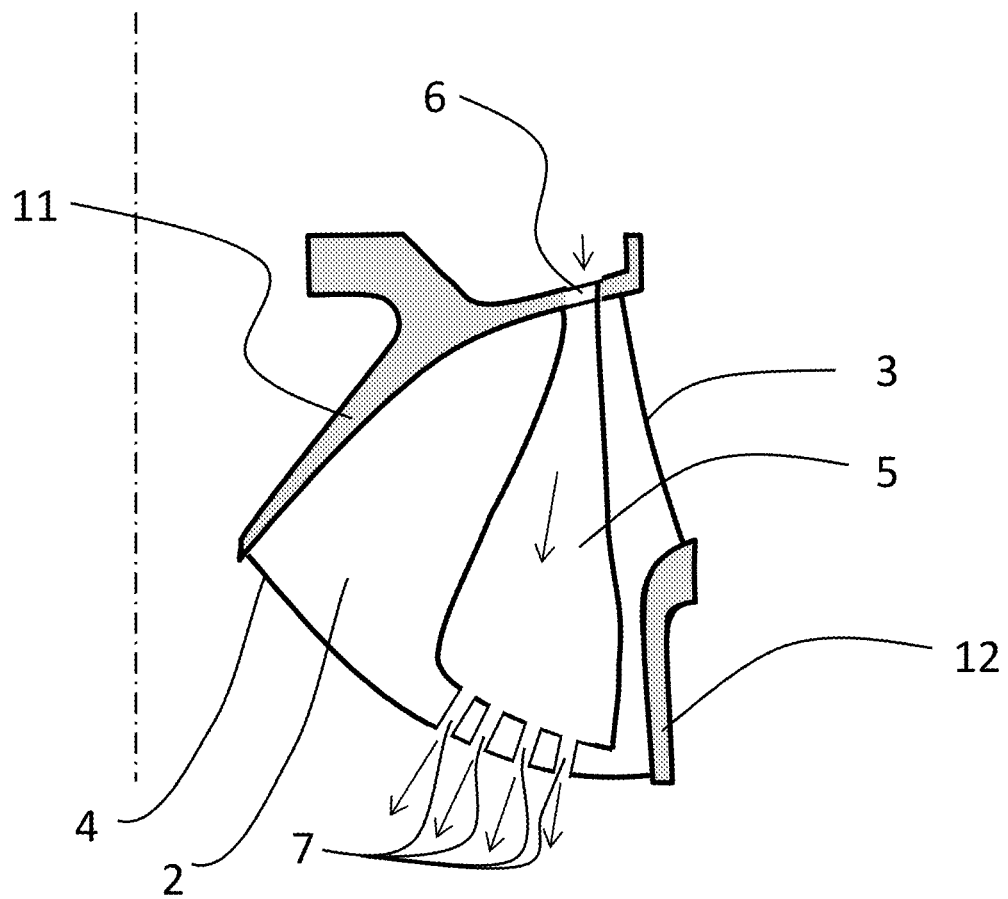
FIG. 3 is a cross-sectional view of a Francis type runner according to another embodiment of a runner of the present invention.

FIG. 3 displays schematically a cross-sectional view of a Francis type runner. The designations are the same as in FIG. 2. The gas passage 5 is differently shaped and forms a number of openings at the trailing edge 4 of the blade 2, each of the openings being designated as 7.

Figure 4:
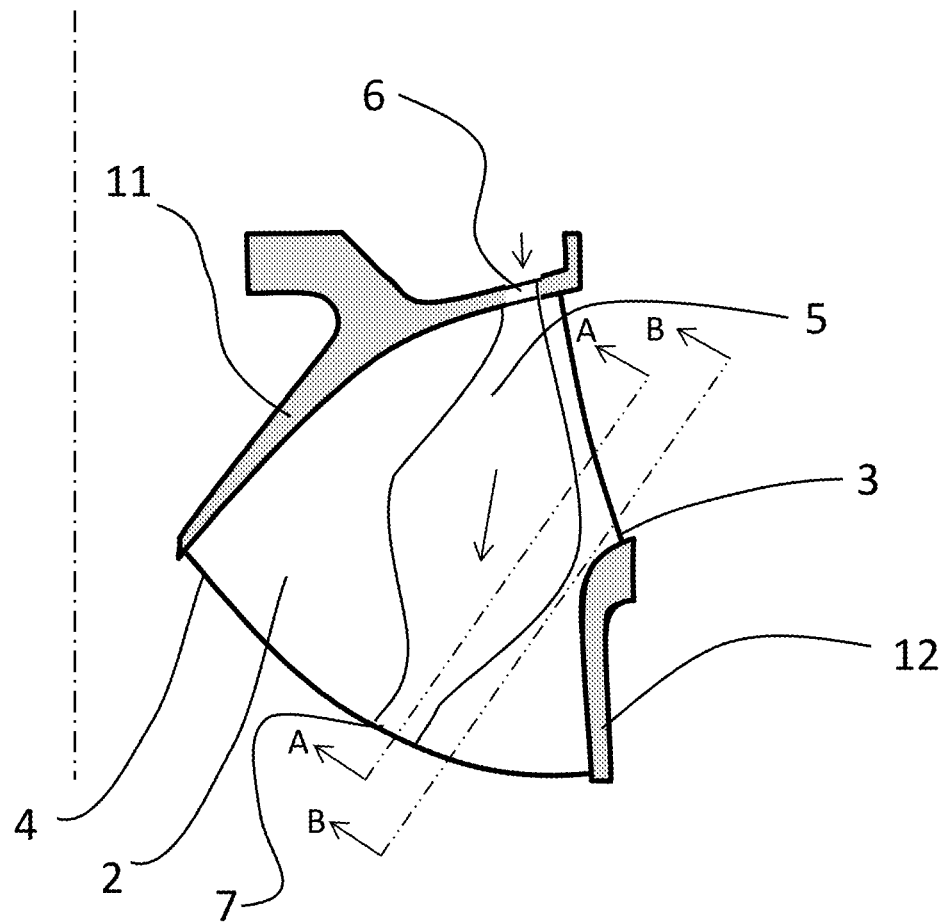
FIG. 4 is a cross-sectional view of a Francis type runner according to another embodiment of a runner of the present invention.

FIG. 4 displays schematically a cross-sectional view of a Francis type runner. The designations are the same as in FIG. 2. The gas passage 5 is differently shaped. FIG. 4 shows two dashed lines A-A and B-B which will be used in the cross-sectional views in the following figures. The line A-A contains a part of the trailing edge 4 where an opening 7 of the gas passage 5 is located, whereas the line B-B contains a part of the trailing edge 4 where no opening 7 of the gas passage is located. Both lines A-A and B-B are orientated perpendicular to the trailing edge 4. Analog lines can be defined for an axial type runner according to FIG. 1.

Figure 5:
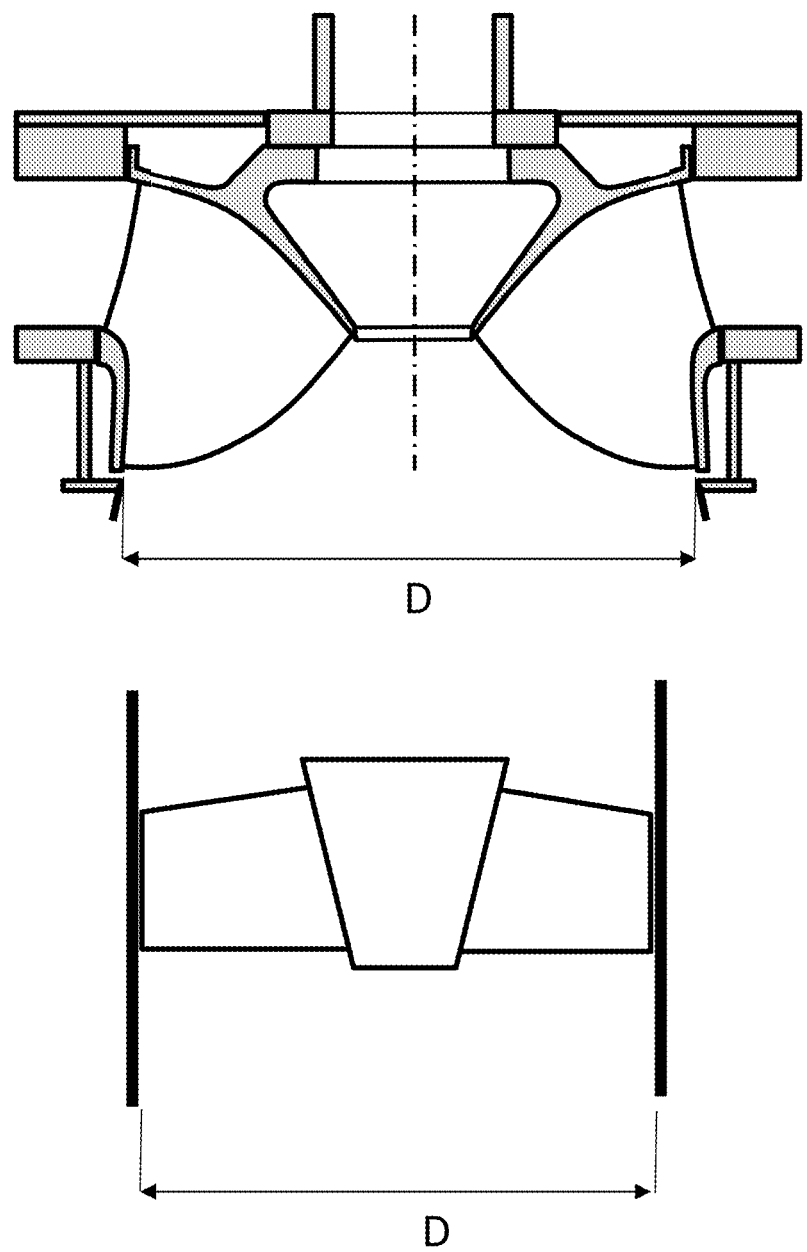
FIG. 5 shows cross-sectional views of a Francis and an axial type runner defining the outlet diameter.

FIG. 5 shows in the upper part a cross-sectional view of a Francis type runner and in the lower part a cross-sectional view of an axial type runner. In each of the views, the outlet diameter of the runner is designated as D.

Figure 6:
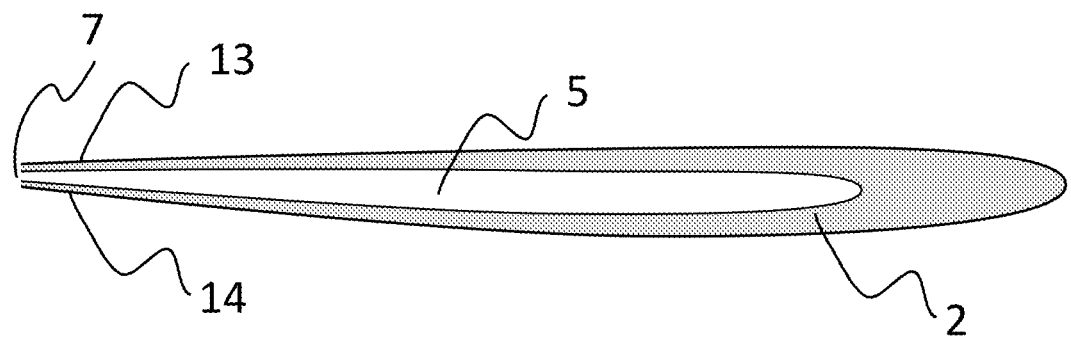
FIG. 6 is a cross-sectional view along A-A of a runner blade.

FIG. 6 is a cross-sectional view of a runner blade 2 along A-A according to FIG. 4. The blade 2 can be part of a Francis type runner or an axial type runner. The same holds for all following figures. The gas passage is designated as 5 and forms an opening at the trailing edge 4 which is designated as 7. The pressure side surface of the blade 2 is designated as 13 and the suction side surface of the blade 2 is designated as 14.

Figure 7:
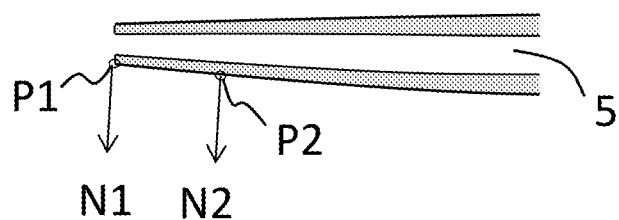
FIG. 7 is an enlarged view of the trailing edge according to the cross-sectional view of FIG. 5 according to the prior art.

FIG. 7 shows a portion of the view according to FIG. 6 near the trailing edge 4 according to the prior art. The point designated as P1 is located on the suction side surface 14 of the trailing edge 4. The point designated as P2 is located on the suction side surface 14 of the blade 2. The distance between point P1 and point P2 is less than 3% of the runner outlet diameter D measured in the direction perpendicular to the trailing edge 4. The arrows are indicating the normal vectors on the suction side surface 14 of the blade 2, whereas the normal vector designated as N1 is located at point P1 and the normal vector designated as N2 is located at point P2. According to the prior art the profile of the suction side surface 14 between the points P1 and P2 is straight or slightly convex meaning that the orientations of the normal vectors N1 and N2 are the same (or differing only very little) or are pointing away from each other.

Figure 8:
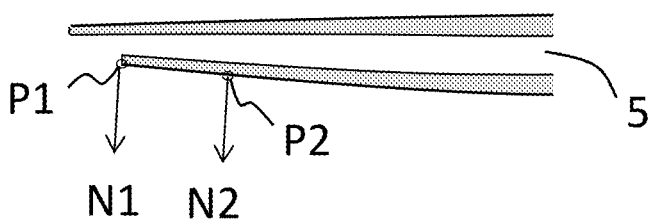
FIG. 8 is an enlarged view of the trailing edge according to the cross-sectional view of FIG. 5 according to another embodiment of the prior art.

FIG. 8 shows a similar portion of the blade 2 as FIG. 7 according to another embodiment of the prior art. The only difference to FIG. 7 is that the pressure side 13 of the blade 2 extends further as the suction side 14 in the direction to the trailing edge 4 of the blade 2.

Figure 9:
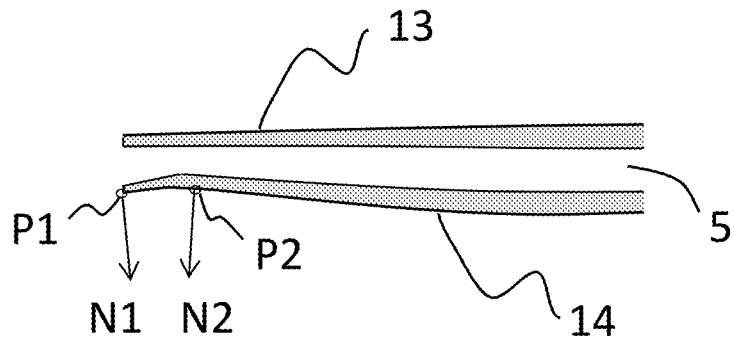
FIG. 9 is an enlarged view of the trailing edge according to the cross-sectional view of FIG. 5 according to the present invention.

FIG. 9 shows a similar portion of the blade 2 as FIG. 7 according to a first embodiment of the present invention. The designations are as usual. According to the present invention, the profile of the suction side surface 14 between the points P1 and P2 is concave.

This special geometry near the runner trailing edge has not been applied in the hydro industry since it would normally result in higher dynamic loading on the runner blades due to the resulting increased strength of von Kárman vortices. The inventors have realized that this problem can however be overcome since the flow of gas through the openings at the trailing edge is mitigating the formation of the vortices.

Figure 10:
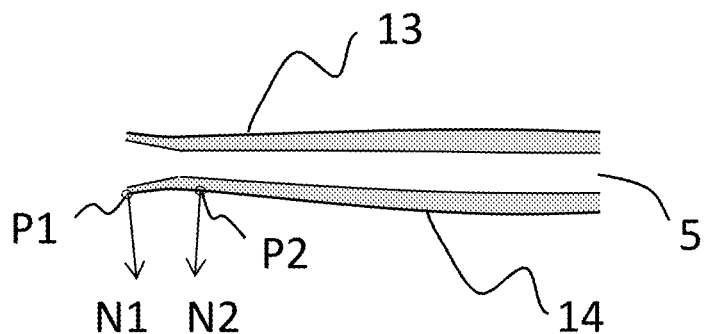
FIG. 10 is an enlarged view of the trailing edge according to the cross-sectional view of FIG. 5 according to another embodiment of the present invention.

FIG. 10 shows another embodiment of the present invention. The difference to the embodiment of FIG. 9 is that the pressure side surface 13 near the trailing edge 4 is not straight as in FIG. 9 but concave.

Figure 11:
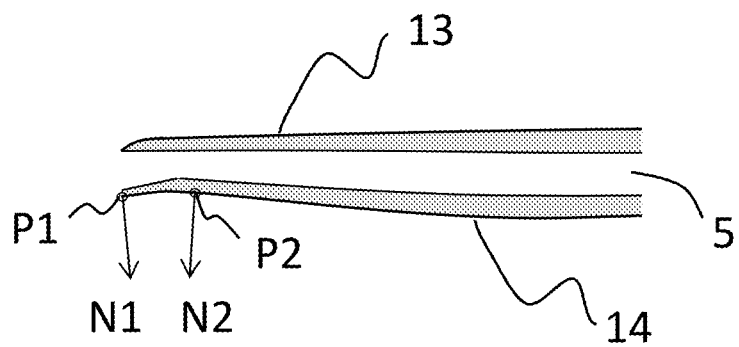
FIG. 11 is an enlarged view of the trailing edge according to the cross-sectional view of FIG. 5 according to another embodiment of the present invention.

FIG. 11 shows another embodiment of the present invention. The difference to the embodiments of FIGS. 9 and 10 is that the pressure side surface 13 near the trailing edge 4 is convex.

The inventors have realized that the positive effect of the invention increases, if the profile of the suction side surface 14 between the points P1 and P2 is concave and the angle between the normal vectors N1 and N2 is at least 2 degrees. Because the profile between P1 and P2 is concave, it is clear that the vectors N1 and N2 are pointing towards each other.

Figure 12:
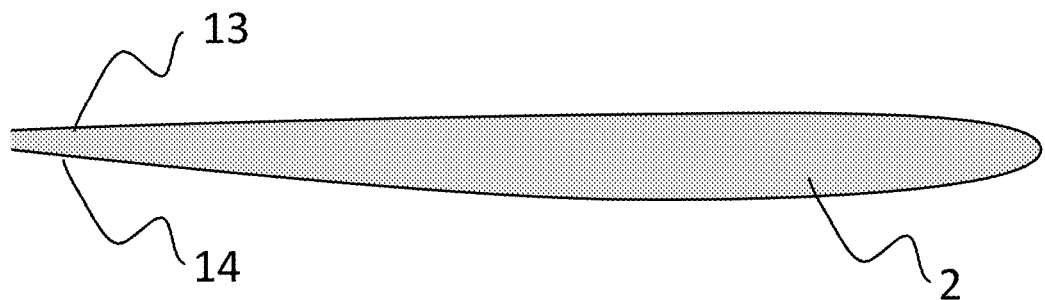
FIG. 12 is a cross-sectional view along B-B of a runner blade.

FIG. 12 is a cross-sectional view of a runner blade 2 along B-B according to FIG. 4.

Figure 13:
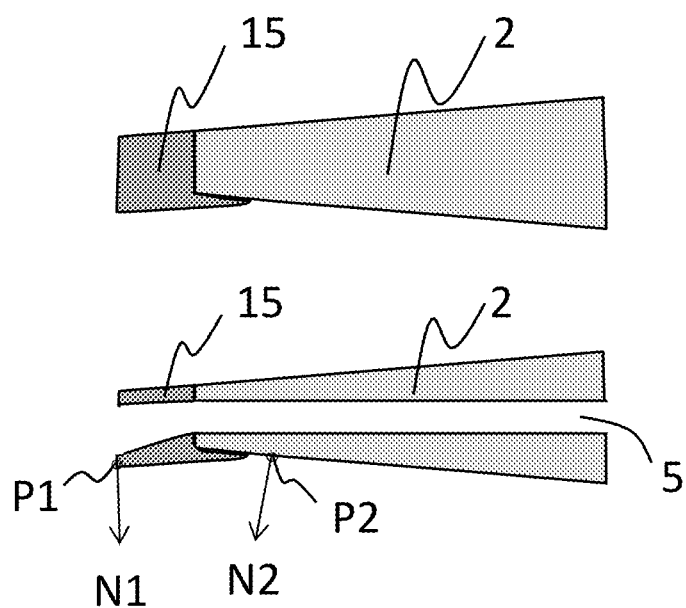
FIG. 13 shows two enlarged cross-sectional views of the trailing edge according to another embodiment of the present invention.

FIG. 13 shows two enlarged cross-sectional views of the trailing edge 4 according to another embodiment of the present invention at different portions of the trailing edge 4. The upper part of FIG. 13 shows a portion of the trailing edge 4 where no opening 7 of the gas passage 5 is located (B-B) and the lower part of FIG. 13 shows a portion of the trailing edge 4 where an opening 7 of the gas passage 5 is located (A-A). The special geometry near the trailing edge 4 according to the present invention is achieved by connecting an additional piece of material to the trailing edge 4 of a blade 2 having a conventional shape. The additional piece of material is designated by 15. In this way a 'new' trailing edge 4 is formed by additional piece of material 15. The lower part of FIG. 13 shows that the gas passage 5 intersects the piece of additional material 15 in the region where an opening 7 is located. The embodiment according to FIG. 13 is easy to manufacture and can be used to apply the present invention to an existing runner aerated according to the prior art. The additional piece of material 15 can be made of steel or any other suited material.

The inventors disclose a method for manufacturing a runner according to the present invention, which is cost-effective and can be applied to an existing aerated runner made according to the prior art. However, the manufacturing of a runner according to the present invention is not restricted to the hereafter-disclosed method, but can be performed using any other suited known method.

Figure 14:
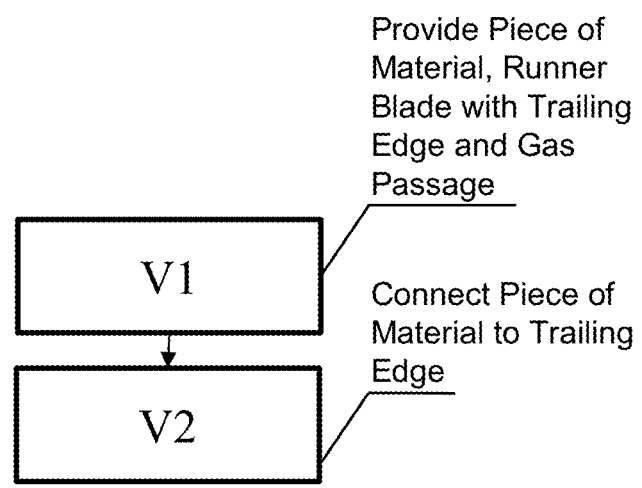
FIG. 14 shows the flow diagram of a method of manufacturing a runner according the present invention.

FIG. 14 shows the flow diagram of a method of manufacturing a runner according the present invention. The method comprises a step designated by V1 in which a piece of material 15 and a runner blade 2 with a trailing edge 4 and a gas passage 5 are provided. The method comprises a step designated by V2 in which the piece of material 15 is connected to the trailing edge 4 of the runner blade 2 e.g. by welding or gluing.

The runner blade 2 in step V1 can be separate or can already be integrated in a mechanical subgroup together with other blades 2 and other parts like a hub 1, a crown 11 and/or a band 12.

Either step V1 or step V2 can comprise the application of an opening 7 to the piece of material 15 in a way that the opening 7 connects to the gas passage 5 of the blade 2 after step V2 has been accomplished. With other words the opening 7 can be applied to the piece of material 15 either before or after it has been connected to the blade 2.

The above-described embodiments of the present invention can be combined with the geometry of the trailing edge shown in FIG. 8 viz. that the pressure side 13 of the blade 2 extends further as the suction side 14 in the direction to the trailing edge 4 of the blade 2.

The present invention is not restricted to the use of atmospheric air for aeration of the runner but can also be beneficial when using compressed oxygen-comprising gas by reducing the required overpressure and thus saving cost of operation.

The invention claimed is:

1. A runner for a hydraulic turbine or pump, the runner comprising:
 a plurality of blades, each blade defined by a pressure side surface, an oppositely facing suction side surface, a leading edge and a spaced apart trailing edge;
 at least one of said blades having a device for supplying a flow of oxygen containing gas to said trailing edge of said at least one blade, said device including a gas inlet aperture, a gas passage and at least one opening in said trailing edge to admit gas out of said gas passage to a passing fluid during operation of the runner;
 said suction side surface of said at least one blade having a concave profile along a cross section through a point P1 and a point P2, said point P1 being located on said suction side surface of said trailing edge at said at least one opening, said point P2 being spaced apart from said point P1 by less than 3% of a runner outlet diameter D and said point P2 being located upstream of said point P1 on a line perpendicular to said trailing edge starting at said point P1.

2. The runner according to claim 1, wherein a first normal vector on said suction side surface located at said point P1 and a second normal vector on said suction side surface located at said point P2 enclose an angle of at least 2 degrees.

3. The runner according to claim 1, wherein the runner is an axial flow runner including a hub and said plurality of blades extending from said hub at circumferentially spaced intervals.

4. The runner according to claim 1, wherein the runner is a Francis turbine including a crown, a band and said plurality of blades extending from said crown to said band at circumferentially spaced intervals.

5. The runner according to claim 1, wherein said pressure side surface extends further than said suction side surface measured from said leading edge along a section camberline in a region of said opening.

6. A method of manufacturing a runner, the method comprising:
 providing the runner according to claim 1 including said at least one blade having said trailing edge and said gas passage;
 providing a piece of material; and
 connecting the piece of material to said trailing edge of said at least one blade.

7. The method according to claim 6, which further comprises forming said at least one opening in said piece of material before connecting said piece of material to said at least one blade, and connecting said at least one opening to said gas passage of said blade after connecting said piece of material to said trailing edge of said at least one blade.

8. The method according to claim 6, which further comprises forming said at least one opening in said piece of material after connecting said piece of material to said at least one blade, and connecting said at least one opening to said gas passage of said at least one blade after connecting said piece of material to said trailing edge of said at least one blade.

* * * * *